(12) United States Patent
Liao

(10) Patent No.: US 6,650,381 B2
(45) Date of Patent: Nov. 18, 2003

(54) BASE OF ARCHITECTURE OF LCD BACKLIGHT SHIELD

(76) Inventor: Chun-Chi Liao, 6F, No. 15-2, Lane 420, Sec. 5, Cheng-Kung Road, Nei Hu Area, Taipei (TW)

( * ) Notice: Subject to any disclaimer, the term of this patent is extended or adjusted under 35 U.S.C. 154(b) by 0 days.

(21) Appl. No.: 10/028,828

(22) Filed: Dec. 28, 2001

(65) Prior Publication Data

US 2003/0123008 A1 Jul. 3, 2003

(51) Int. Cl.⁷ .................. G02F 1/333; G02F 1/1335
(52) U.S. Cl. .................. 349/58; 349/61; 349/70
(58) Field of Search .................. 349/58, 155, 70, 349/65, 110, 153, 61

(56) References Cited

U.S. PATENT DOCUMENTS

| | | | | |
|---|---|---|---|---|
| 6,134,092 A | * | 10/2000 | Pelka et al. | 361/31 |
| 6,219,116 B1 | * | 4/2001 | Yuuki et al. | 349/58 |
| 6,304,308 B1 | * | 10/2001 | Saito et al. | 349/155 |
| 6,341,879 B1 | * | 1/2002 | Skinner et al. | 349/70 |
| 6,504,587 B1 | * | 1/2003 | Morishita et al. | 349/58 |
| 6,512,558 B2 | * | 1/2003 | Kim | 349/58 |
| 6,515,721 B2 | * | 2/2003 | Jin et al. | 349/58 |

* cited by examiner

Primary Examiner—John F. Niebling
Assistant Examiner—Walter L. Lindsay, Jr.
(74) Attorney, Agent, or Firm—Browdy and Neimark, P.L.L.C.

(57) ABSTRACT

A base architecture of LCD backlight shield mainly comprises a frame base, a reflection sheet, and a heat sink, in which the reflection sheet and the heat sink are attached together; the heat sink is snap-retained at a bottom edge of the frame base; a lighting device is inserted between the frame base and the heat sink; and a light-intensity equalizing board is embedded in the top edge of the frame base and held by a check plate fixed in each corner on the front face of the frame base. By using this base architecture, to dissipate the heat generated in the backlight shield and accordingly heighten quality and prolong lifetime of a LCD component is expectable.

3 Claims, 5 Drawing Sheets

BASE OF ARCHITECTURE OF LCD BACKLIGHT SHIELD

BACKGROUND OF THE INVENTION

As a light set is generally installed and hermetically sealed on the base of a backlight shield in a liquid crystal display (LCD), therefore, heat generated by the light set would raise the temperature of the backlight shield to deteriorate function and shorten lifetime of the LCD. This problem didn't seem to trouble the LCD makers very much because of its miniature size and allowable heat accumulation of the conventional LCD in the past, however, it becomes a real problem now since the LCD is demanded bigger in size and better in quality, and the way "to dissipate rapidly the heat generated" becomes an important issue non-negligible today.

SUMMARY OF THE INVENTION

The primary object of this invention is to provide a base architecture of LCD backlight shield, through which the heat generated in the backlight shield can be effectively dissipated to heighten quality and prolong lifetime of a LCD component.

In order to realize abovesaid object, the base architecture of LCD backlight shield of this invention mainly comprises a frame base, a reflection sheet, and a heat sink, in which the reflection sheet and the heat sink are attached together; the heat sink is snap-retained at a bottom edge of the frame base; a lighting device is inserted between the frame base and the heat sink; and a light-intensity equalizing board is embedded in the top edge of the frame base and held by a check plate fixed in each coener on the front face of the frame base. By taking advantage of the heat sink and a top seat on the reflection sheet, the light-intensity equalizing board wouldn't deform to bend or fall down when heated, and heat generated inside the frame base is well dissipated through a plurality of primary and secondary heat-dissipation holes.

The merits of this invention may be summarized as the following:

1. High efficiency in heat dissipation and long lifetime of the component are achieved.
2. Design of the primary and secondary heat-dissipation holes in the frame base is instrumental to heat dissipation significantly.
3. Combination of the heat sink and the frame base and assembly of the LCD component is much easier and faster.

For more detailed information regarding advantages or features of this invention, at least an example of preferred embodiment will be fully described below with reference to the annexed drawings.

BRIEF DESCRIPTION OF THE DRAWINGS

The related drawings in connection with the detailed description of this invention to be made later are described briefly as follows, in which.

DETAILED DESCRIPTION OF THE INVENTION

Figure 1:
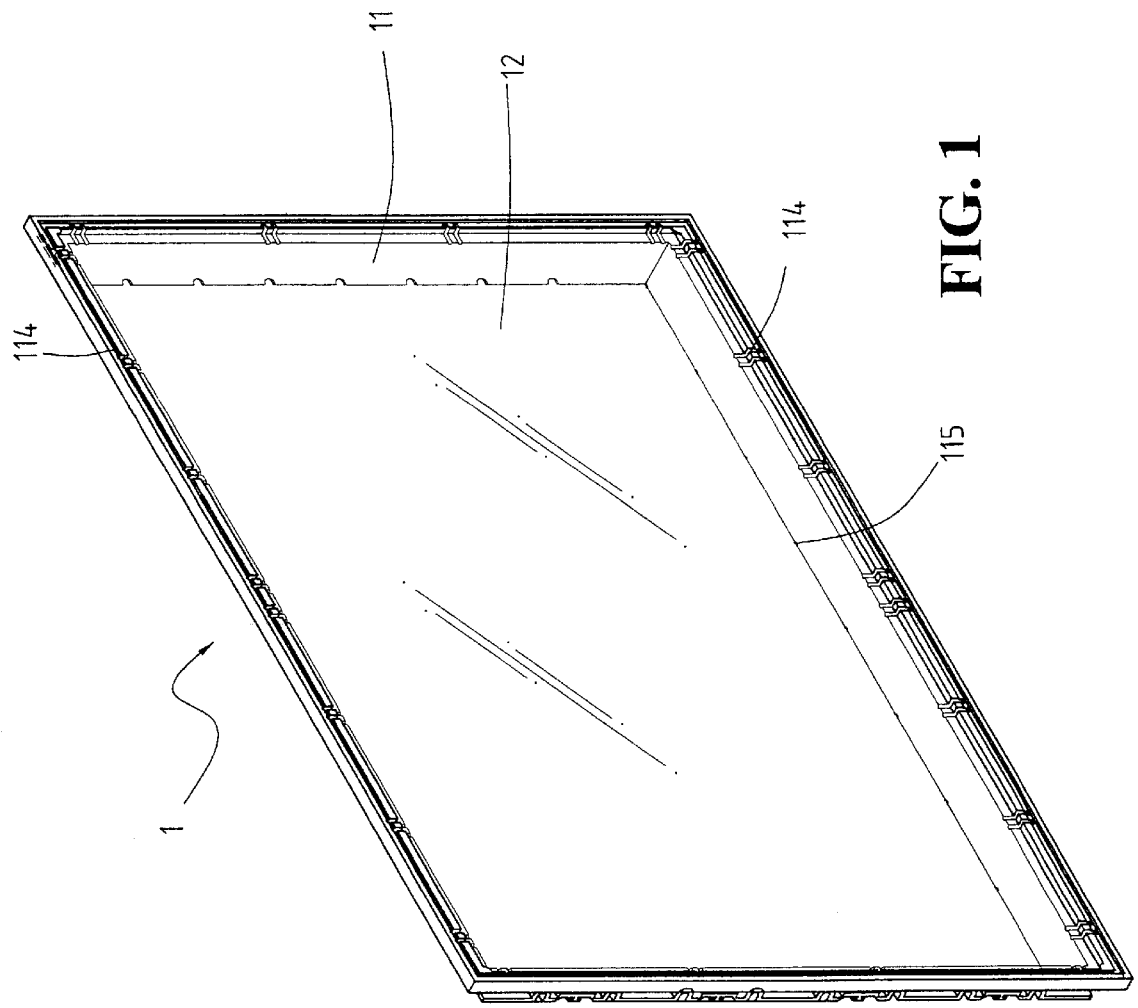
FIG. 1 is a schematic view of this invention in three dimensions.
Figure 2:
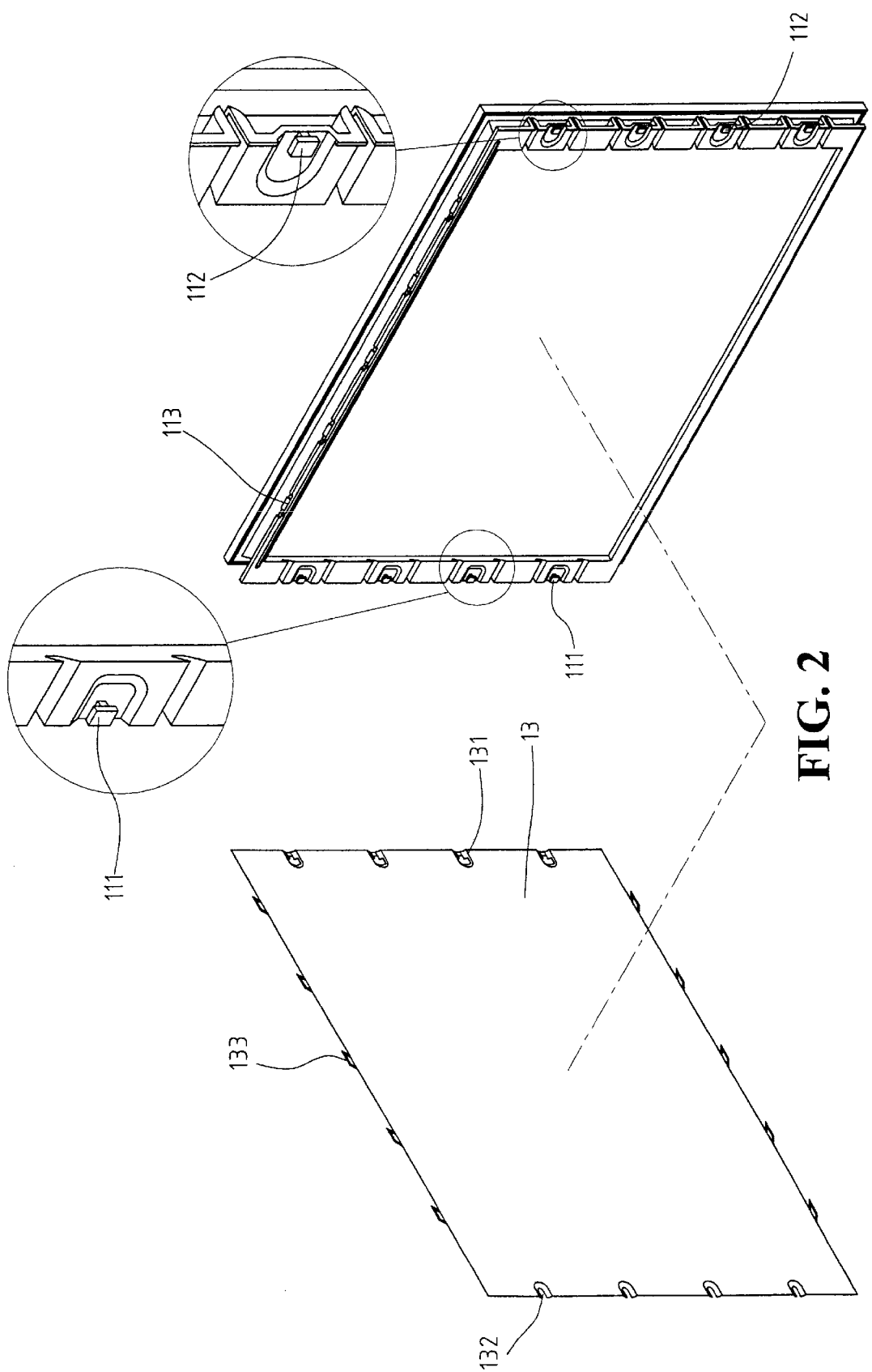
FIG. 2 is an exploded view of embodiment (1) of this invention in three dimensions.
Figure 3:
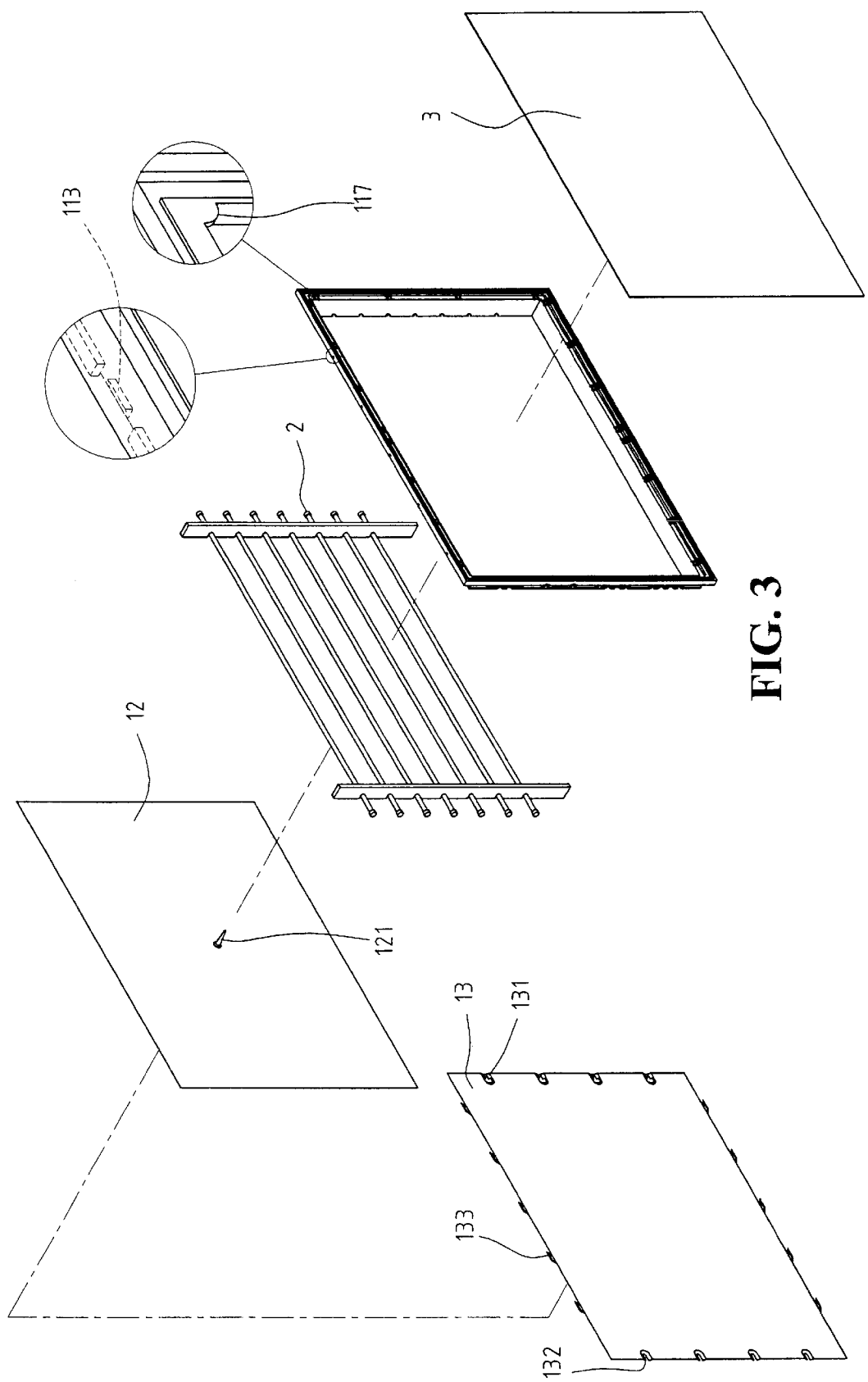
FIG. 3 is an exploded view of embodiment (2) of this invention in three dimensions.

As illustrated in FIGS. 1, 2, and 3, the base of a backlight shield (1) is composed of a frame base (11), a reflection sheet (12), and a heat sink (13), wherein both the reflection sheet (12) and the heat sink (13) are sheet pieces attached together.

A plurality of primary and secondary snap holes (131, 132) is formed in a pair of opposite lateral edges of the heat sink (13) respectively for buckling with a plurality of corresponding primary and secondary snap buttons (111, 112) formed in two opposite lateral bars on the bottom face of the frame base (11) such that the heat sink is fixedly attached to the frame base (11).

After combination of the frame base (11) and the heat sink (13), a plurality of foldable combination hooks (133) available at a top and a bottom edge of the heat sink (13) are bent to grasp corresponding retaining pieces (113) on the frame base (11) to have the heat sink (13) fixedly jointed with the frame base (11). Moreover, a lighting device (2) is inserted between the frame base (11) and the heat sink (13).

A light-intensity equalizing board (3) is embedded in the top edge of the frame base (11) and held by a check plate (117) fixed in each corner of the frame base. By taking advantage of the heat sink (13) and a top seat (121) on the reflection sheet (12), the light-intensity equalizing board (3) wouldn't deform to bend or fall down when heated. Besides, heat generated inside the frame base (11) can be well dissipated through a plurality of primary and secondary heat-dissipation holes (114, 115).

Figure 4:
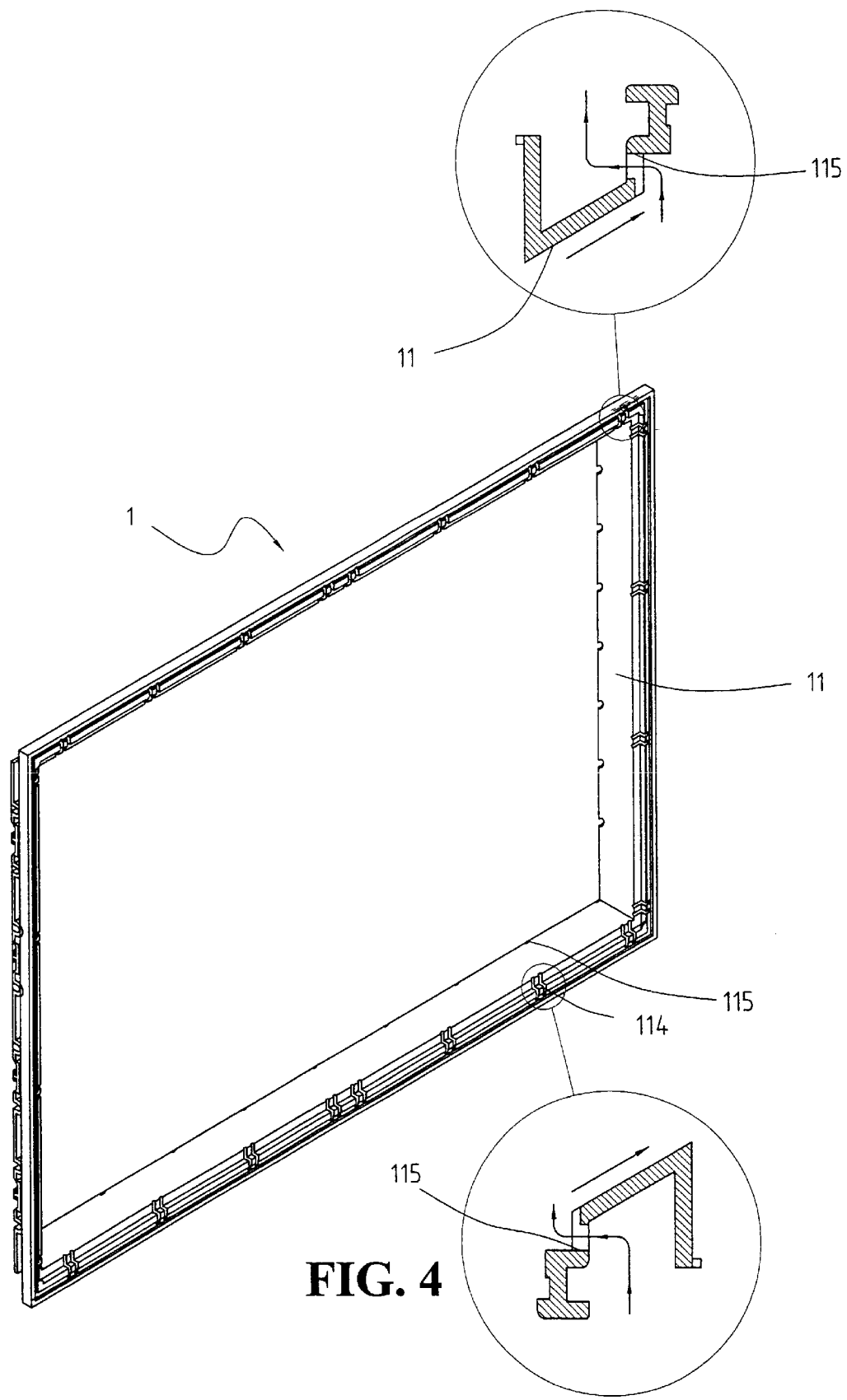
FIG. 4 is a perspective view of embodiment (1) of this invention.
Figure 5:
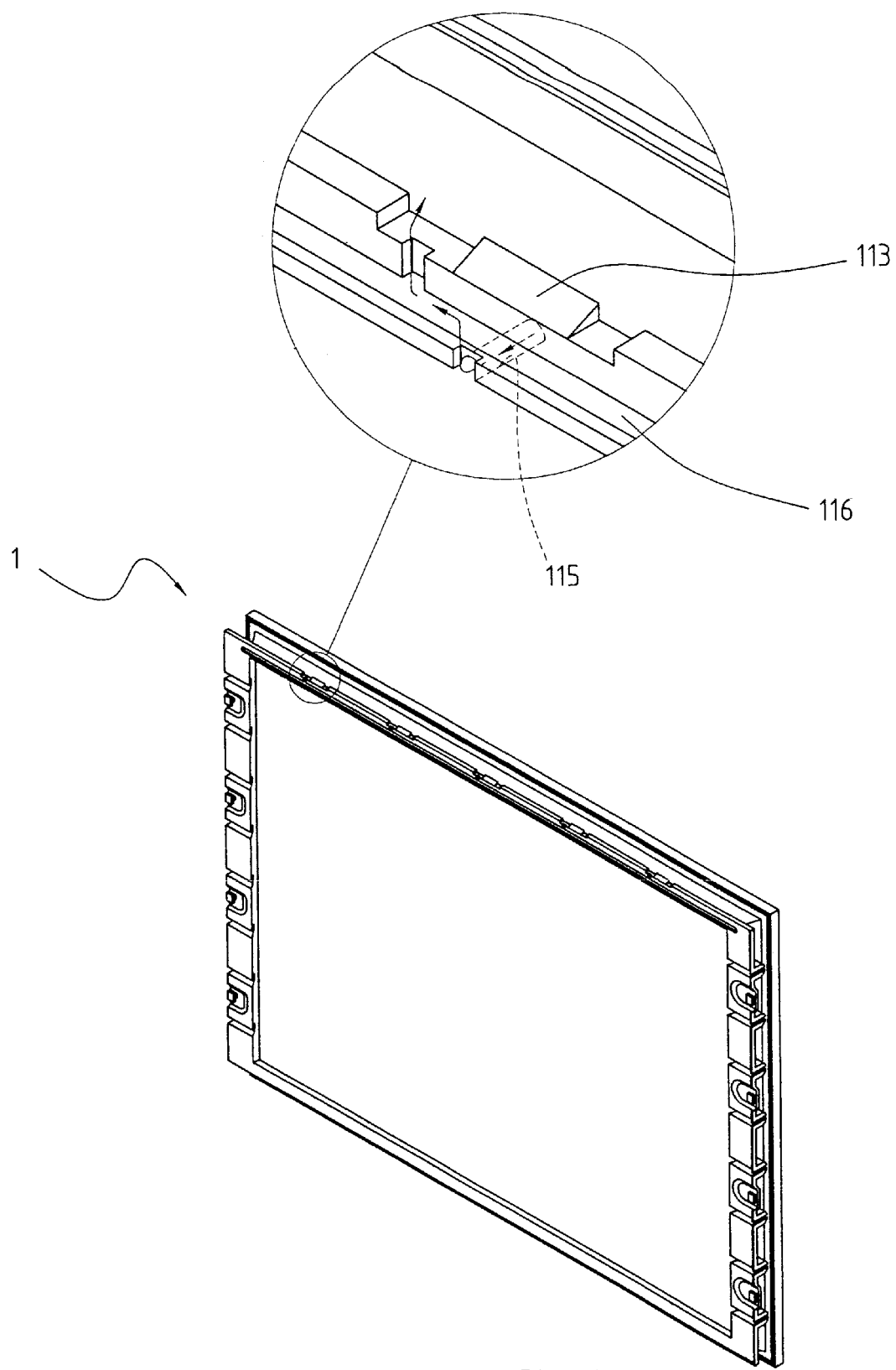
FIG. 5 is a perspective view of embodiment (2) of this invention.

Referring to FIGS. 4 and 5, the primary heat-dissipation holes (114) are arranged in a front peripheral edge of the frame base (11). When the heat generated from the lighting device (2) inside the frame base (11) flows to escape through those primary heat-dissipation holes (114) in the top edge of the frame base (11), the external cold air would enter the frame base (11) through the primary heat-dissipation holes (114) in the bottom edge of the frame base to commit air convection and promote heat dissipation efficiency.

Moreover, several secondary heat-dissipation holes (115) are also distributed to a top and a bottom edge of the frame base (11) to allow heat dissipation through the secondary holes. An exhaust channel (116) is formed on the outward side of the frame base (11) and communicable with the secondary heat-dissipation holes (115) such that the rejected air out of the secondary heat-dissipation holes (115) would flow through the exhaust channel (116) to reach outside of the frame base (11).

In the above described, at least one preferred embodiment has been described in detail with reference to the drawings annexed, and it is apparent that numerous variations or modifications may be made without departing from the true spirit and scope thereof, as set forth in the claims below.

What is claimed is:

1. A base architecture of LCD backlight shield, comprising:
    a frame base, a reflection sheet, and a heat sink, in which the reflection sheet and the heat sink are attached together; the heat sink is snap-retained at a bottom edge of the frame base; and a plurality of primary and secondary heat-dissipation holes is formed in the inner peripheral edge of the frame base in order to facilitate heat dissipation.

2. The base architecture according to claim 1, wherein a check plate is fixed in each of four corners on the front face of the frame base.

3. The base architecture according to claim 1, wherein a plurality of primary and secondary snap holes is formed in a pair of opposite lateral edges of the heat sink respectively for buckling with a plurality of corresponding primary and secondary snap buttons formed in two opposite lateral bars on the bottom face of the frame base such that the heat sink is fixedly attached to the frame base; and a plurality of foldable combination hooks is available at a top and a bottom edge of the heat sink and to be bent to grasp corresponding retaining pieces on the frame base so as to enhance the combination of the heat sink and the frame base.

\* \* \* \* \*